United States Patent
Attali et al.

(10) Patent No.: US 7,881,727 B2
(45) Date of Patent: Feb. 1, 2011

(54) METHOD OF LOCATING MOBILE COMMUNICATING OBJECTS WITHIN A COMMUNICATIONS NETWORK, COMPRISING THE TRANSMISSION OF LOCATION IDENTIFIERS BY REPEATERS AND SERVER UPDATES

(75) Inventors: Isabelle Attali, Antibes (FR); Denis Caromel, legal representative, Antibes (FR); Fabrice Huet, Valbonne (FR)

(73) Assignees: Inria Institut National de Recherche En Informatique Et En Automatique, Cedex (FR); Unsa Universite de Nice Sophia Antipolis, Nice (FR)

( * ) Notice: Subject to any disclaimer, the term of this patent is extended or adjusted under 35 U.S.C. 154(b) by 780 days.

(21) Appl. No.: 10/565,208

(22) PCT Filed: Jul. 15, 2004

(86) PCT No.: PCT/FR2004/001853

§ 371 (c)(1),
(2), (4) Date: Jul. 17, 2007

(87) PCT Pub. No.: WO2005/020506

PCT Pub. Date: Mar. 3, 2005

(65) Prior Publication Data

US 2008/0096577 A1 Apr. 24, 2008

(30) Foreign Application Priority Data

Jul. 23, 2003 (FR) .................................. 03 08990

(51) Int. Cl.
*H04W 24/00* (2009.01)
*H04B 7/185* (2006.01)

(52) U.S. Cl. .................................. 455/456.1; 455/13.1

(58) Field of Classification Search .......... 455/456.1–6, 455/8–25; 379/142.1, 201.06, 207.12; 701/1–302; 340/854.1, 989–996, 539.13, 825.36, 825.49
See application file for complete search history.

(56) References Cited

U.S. PATENT DOCUMENTS 6,775,258 B1 * 8/2004 van Valkenburg et al. ... 370/338

FOREIGN PATENT DOCUMENTS

WO    WO 97/02680 A    1/1997
WO    WO 01/69869 A    9/2001

* cited by examiner

*Primary Examiner*—George Eng
*Assistant Examiner*—Chayce Bibbee
(74) *Attorney, Agent, or Firm*—Foley & Lardner LLP

(57) ABSTRACT

The invention relates to a mobile communicating object (A) belonging to a communications network and comprising processing means (PM). According to the invention, when a communication has been established with another communicating object (S) belonging to the network, the aforementioned processing means generate a repeater (Fi) at each site (Hi) through which they pass. Moreover, when the repeater is generated, the processing means associate a timing counter (CTF) therewith and configure said repeater such that: (i) it can store an identifier that is representative of the location of the next repeater (F(i+1)) or site (H(i+1)) in the chain of repeaters to which it belongs; and (ii) at the end of a selected duration of time, it transmits the location identifier of the next repeater (F(i+1)) or site (S(i+1)) to at least one location server (SL) in the network, so that it stores said identifier together with the primary identifier of the mobile object (A). Preferably, once a repeater has addressed the location identifier, the relay activity thereof is terminated and, if the repeater does not belong to another chain, it is removed so that it no longer consumes resources.

24 Claims, 4 Drawing Sheets

Figure 1:
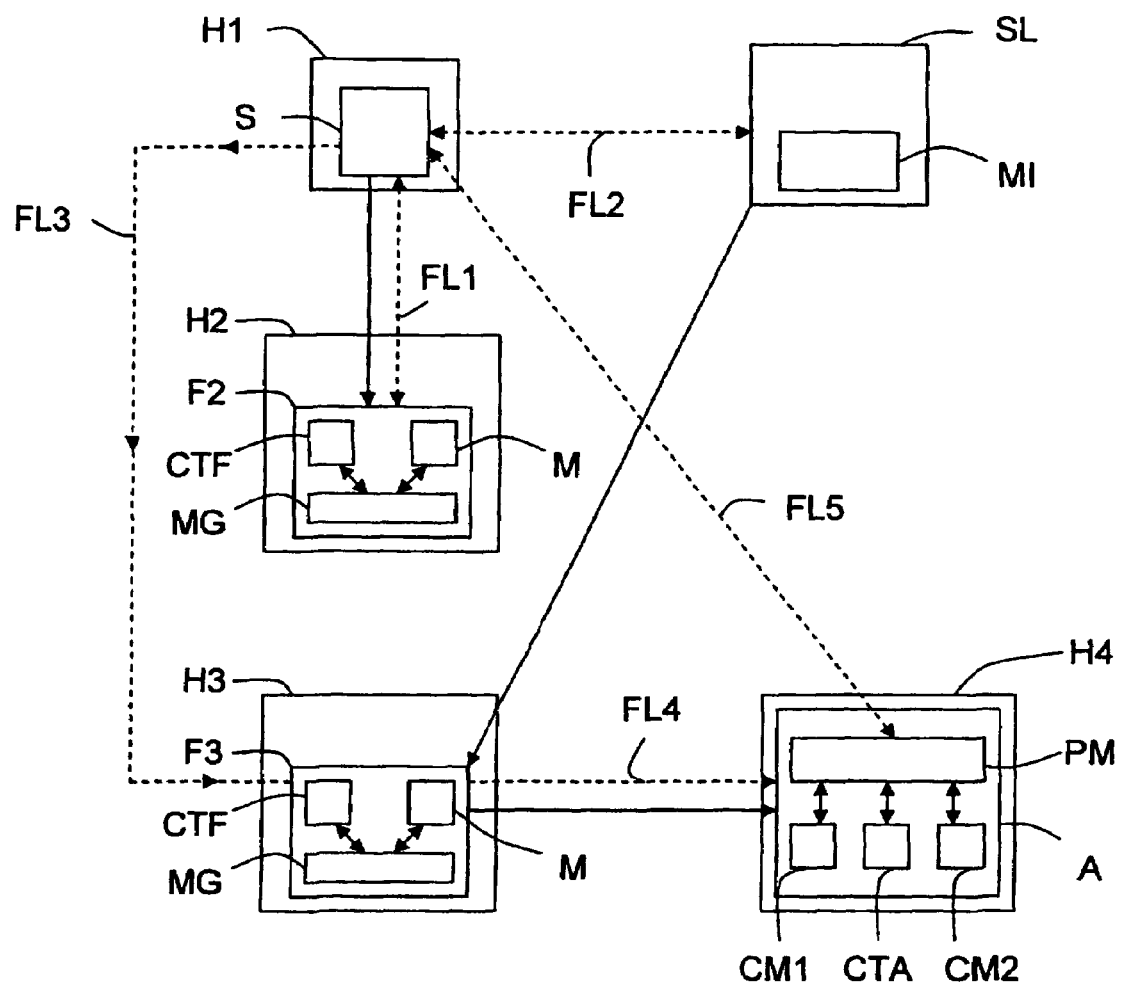

METHOD OF LOCATING MOBILE COMMUNICATING OBJECTS WITHIN A COMMUNICATIONS NETWORK, COMPRISING THE TRANSMISSION OF LOCATION IDENTIFIERS BY REPEATERS AND SERVER UPDATES

The invention relates to the field of communications networks and more particularly the location of communicating mobile objects within such networks.

In this case, "object" is taken to mean anything which is capable of exchanging data, in particular communication terminals such as mobile telephones, portable computers, and electronic personal organisers, but also calculations being carried out, mobile applications, logical or physical resources, or even users.

In communications networks, numerous mobile objects are frequently moving from one domain (or site) to another, thus changing address, or name, or even designation space. Two methods are currently used for contacting or locating such mobile objects.

The first method consists in using a location server which keeps a location table updated in which are stored the last known location references (or location identifiers) of mobile objects. Thus, when a first mobile object, known as the "source", wants to communicate with a second mobile object, known as the "agent", which has moved, it first of all interrogates the location server in order for this to transmit to the same the last known location reference of this agent. Then, the source tries to make contact with this agent at the location reference received. If the reference is still valid, the communication can be carried out. If not (the agent has migrated), the source must again interrogate the location server in the hope that the agent has recently communicated thereto its new location reference, then try again to contact the agent.

With such a method, more than one attempt may be necessary by the source before it succeeds in contacting the agent. Furthermore, when the agent is moving rapidly within a large geographical area, it is not generally guaranteed that the communication can be made between the source and the agent.

The second method consists in implementing a mechanism allowing a source to transmit a message to an agent without having his explicit location reference or an intermediate reference. This method is better known as "routing". This involves in fact using the subjacent infrastructure, both software and hardware, of the network in order to transport a message to its destination.

Each time an agent (also known as the object) prepares to leave a site (or domain), he generates a specific object known as a "repeater" (or "forwarder"), which he leaves at the said site. Here, "site" is intended to mean a physical or logical entity capable of receiving mobile objects, such as a portable computer, a mobile telephone or an electronic personal organiser connected to a WiFi, GSM/GPRS or UMTS network, a virtual java machine, a GSM cell or the like. There is thus formed between a source and an agent a chain of repeaters defining a virtual path which is used by the messages sent by the source and intended for the agent.

With this method, when one of the repeaters of a chain is weak or disappears, which is relatively frequent, the source finds it impossible to contact or locate the agent concerned.

Since neither of these methods is entirely satisfactory, the invention therefore aims to improve the situation.

It proposes to this end a method dedicated to locating communicating mobile objects within a communications network, and in which, in the case of establishing a communication between first and second objects, the second of which at least is mobile, repeaters are generated at sites through which the second object passes and communicate from one to the next within a chain formed by them together in order to relay towards the second object any location message originating from the first object.

This method is characterised by the fact that it also consists, on the one hand, in storing in each repeater an identifier representing the location of next the repeater or site within the chain, and on the other hand in allocating a timer to each repeater at the moment when this is generated in order that when a selected duration has expired, it can address to at least one location server of the network the location identifier of next the repeater or site in order that it can be stored in the server as correspondence of a primary identifier of the second object.

The method according to the invention may comprise other features which can be taken separately or in combination, in particular:

- a first migration counter can be allocated to the second object, then the value of this first counter at the creation of each new repeater at a site can be incremented by one unit, and then the value can be compared to a selected threshold in order that if the threshold is exceeded the second object addresses to the server its own location identifier in order that it is stored as correspondence of its primary identifier, the first counter being then reinitialised,
- a timer can be allocated to the second object in order that upon expiry of a selected duration it addresses to the server its own location identifier, so that this is stored in the server as correspondence of its primary identifier, the timer then being initialised so that a new count is started. In this case, the count of the timer can be triggered after being initialised when the result of the comparison indicates that the value of the first counter is lower than the threshold,
- the first counter can be initialised after each transmission to the server of the location identifier of the second object,
- the counting of the timer of the second object can be stopped each time this migrates to another site,
- the repeater preferably ceases its relay activity after addressing its location identifier. In this case, when the repeater has ceased its relay activity and if it does not belong to another chain, it is advantageous to proceed to cancel the same in order that it does not use up further resources,
- each repeater can be allocated a position identifier representing its position within the chain. In this case, upon expiry of the selected duration, the repeater can address to the server the location identifier of the next repeater or site, as well as its own position identifier in order that they are stored as correspondence of the primary identifier of the second object. It is also advantageous to store in the server, as correspondence of the identifier of the second object, the position identifier of the transmitting repeater and the location identifier of the next repeater or site when the position identifier has a value higher than that stored,
- the second object can be allocated a second position counter whose value is incremented by one unit upon each of its inter-site migrations and which defines a position identifier representing its position within the chain. In this case, when the value of the first counter exceeds the selected threshold, it is particularly advantageous that the second object addresses to the server its own location identifier and the position identifier representing the value of its second counter in order that they are stored in the server as correspondence of the primary identifier of the second object. Therefore, in the server are stored as correspondence of the primary identifier of the second object its position identifier and its location identifier if this has a value higher than that stored, the position identifier of a repeater of a site preferably represents the value of the second counter of the second object at the moment when this leaves the site.

The invention further relates to a communicating mobile object for a communications network, the mobile object having processing means having the responsibility, when a communication has been established with another communicating object of the network, of generating repeaters in the sites through which their mobile object passes.

This mobile object is characterised in that its processing means are capable of allocating to each repeater a timer at the moment when it is generated and of configuring this repeater in order that on the one hand it can store an identifier representing the location of the next repeater or site within the chain, and on the other hand that it transmits to at least one location server of the network, upon expiry of a selected duration, the location identifier of the next repeater or site in order that it stores this as correspondence of the primary identifier of the mobile object.

The mobile object according to the invention may comprise further features which will be taken separately or in combination, in particular:

a first migration counter. In this case, the processing means are contrived to increment by one unit the value of the first counter each time they generate a new repeater in a site, then to compare the value to a selected threshold, then, if the threshold is exceeded, to address to the server the location identifier of the mobile object in which they are implanted in order that it stores this as correspondence of its primary identifier, and finally in order to initialise the first counter, a timer. In this case, the processing means are contrived to address to the server the location identifier of the mobile object in which they are implanted each time that a selected duration expires, in order that it stores this as correspondence of its primary identifier, then in order to initialise the timer so that a new count starts. It is furthermore particularly advantageous that the processing means are contrived so as to trigger counting of the timer after it has been initialised each time the result of the comparison indicates that the value of the first counter is lower than the threshold, the processing means may be responsible for initialising the first counter after each transmission to the server of the location identifier of their mobile object, consequent upon a comparison relating to the time spent on the site, the processing means may be responsible for stopping counting of the timer when their mobile object migrates from one site to another site, the processing means may be responsible for configuring each repeater at the moment when it is generated so that it ceases its activity after having addressed its location identifier to the server, the processing means may be responsible for allocating to each repeater, at the moment when it is generated, a position identifier representing its position within the chain, in order that upon expiry of the selected duration the repeater addresses to the server the location identifier of the next repeater or site and its own position identifier so that these are stored in the server as correspondence of the primary identifier of the mobile object, a second migration counter whose value defines a position identifier representing the position of the mobile object within the chain. In this case, the processing means are preferably responsible for incrementing by one unit the value of the second counter upon each migration of the mobile object, and for transmitting to the server the location and position identifiers of the mobile object in which they are implanted if the first counter exceeds the selected threshold, in order that these are stored by the server as correspondence of the primary identifier of the mobile object. Furthermore, it is particularly advantageous that the processing means are contrived, when the mobile object in which they are implanted leaves a site, to communicate to the repeater of the site the value of the second counter in order that it forms the position identifier of the repeater.

Figure 2:
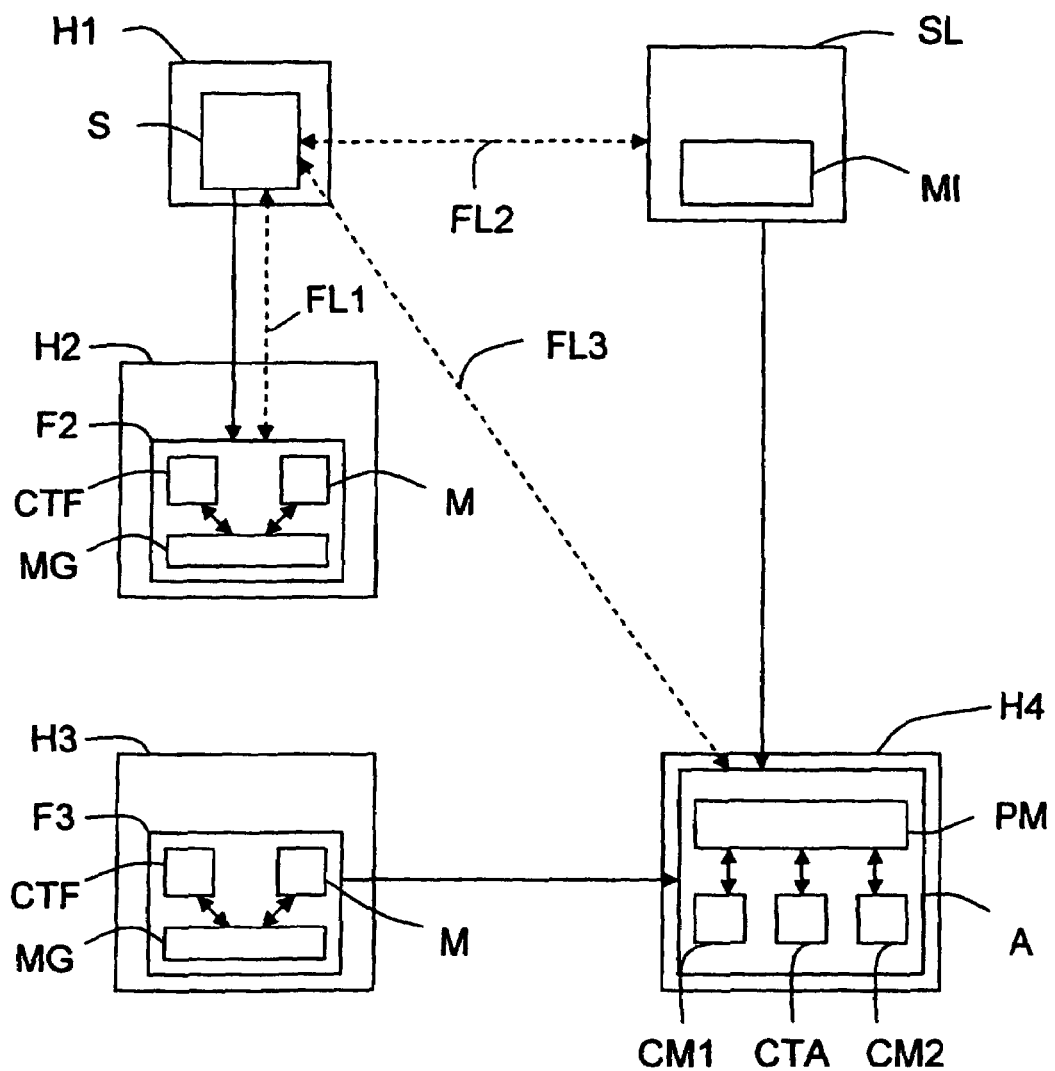
Figure 3:
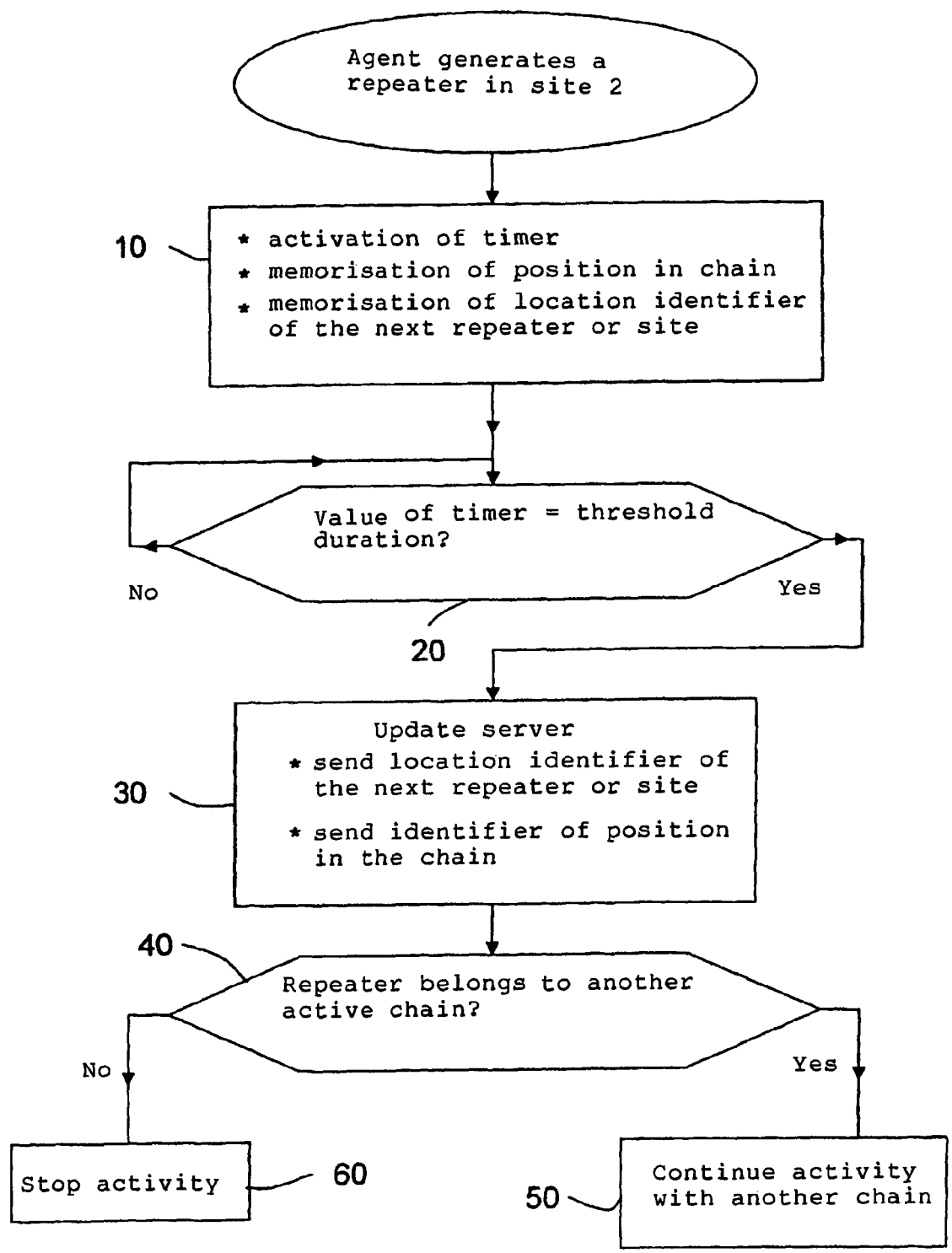
Figure 4:
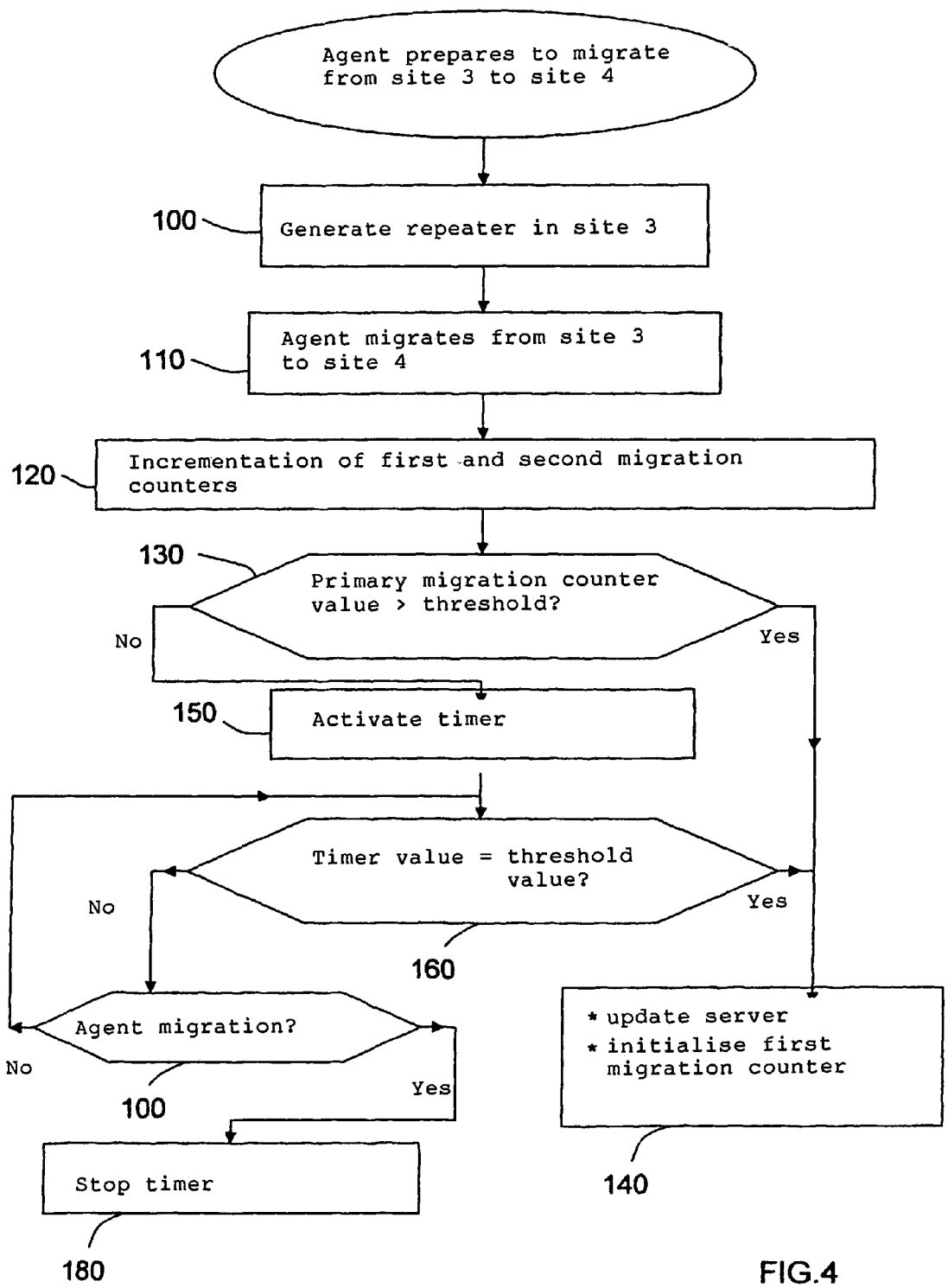

Further features and advantages of the invention will appear from studying the detailed description below and from the attached drawings, which show:

FIG. 1, a diagram in the form of functional blocks of part of a communications network implementing a location method according to the invention, within the context of a first example of interruption of a chain of repeaters, FIG. 2, a diagram in the form of functional blocks showing part of a communications network implementing a location method according to the invention within the context of a second example of interruption of a chain of repeaters, FIG. 3, a diagram showing an example of a function algorithm of a repeater according to the invention, and FIG. 4, a diagram showing an example of a function algorithm of an "agent"-type mobile object according to the invention.

The attached drawings not only serve to supplement the invention, but may also contribute to its definition if necessary.

The invention relates generally to the location of communicating mobile objects within networks.

As is indicated in the introduction, the invention relates to any type of communicating mobile object, i.e. capable of exchanging data, such as for example communication terminals such as mobile telephones, portable computers, electronic personal organisers and logical computing units which can move from one site to another, but also calculations being carried out, mobile applications, logical or physical resources, and even users.

In the following description, given by way of example, it is considered that the communicating mobile objects are mobile terminals, such as mobile telephones, belonging, for example, to a WAN-type (or "Wide Area Network") communication network. Obviously, the invention is not limited to this type of network. It applies in particular also to networks known as LAN-type (or "Local Area Network") locations and to MAN-type ("Metropolitan Area Network") metropolitan networks.

As is shown in FIG. 1, a WAN-type communications network comprises, very diagrammatically, a large number of communication (or "host") hardwares Hi (in this case i=1 to 4) capable of exchanging between themselves data (or messages) by virtue of the software and hardware infrastructure of the network, and each defining a site (Hi) associated with a location identifier, such as for example a communication address (of the Internet or telephone type), or a name, or even a designation space.

For example, the sites H1 to H4 are fixed computers connected by cable to the WAN network, having an Internet address, which defines their location identification, and/or possibly equipped with an interface for the connection of a mobile telephone allocated to a primary identifier, such as a telephone number.

The example of a portion of a network shown in FIG. 1 corresponds to a situation in which a communicating object S, which may be mobile, hereinafter called "the source", is implanted in the (or connected to) the site H1 and has several moments before established a communication with a communicating mobile object A, hereinafter called "the agent", which was then connected to the site H2 and which has since moved to the site H3, then to the site H4.

In other words, this situation corresponds to an agent A (here a mobile telephone) which has been successively connected to three sites H2, H3 and H4, having three different location identifiers (or references).

The agent (or communicating mobile object) A comprises a processing unit PM. This is adapted, when its agent A has established a communication with a source S, so as to generate in each site Hi through which it passes (i.e. to which the agent A is momentarily "connected") a repeater (or "forwarder") Fi.

A repeater Fi is a specific object generated by an agent A, generally at the moment when it is preparing to leave a site Hi in order that it relays to the next repeater F(i+1) or to the next site H(i+1) each message originating from the source S and which is intended therefor. Thus, as the displacements (or migrations) of the agent A take place, a chain of repeaters Fi is formed, which defines a virtual path between the source S and the agent A, allowing the communication from one repeater to the next of location messages originating from the source S.

In order to allow a repeater Fi to contact the same in the next site H(i+1), the agent A communicates thereto, when it creates the same, the location identifier of the said site and the primary identifier of the agent. This location identifier is then stored in a memory M.

The technology used to generate a repeater is perfectly well known to the person skilled in the art. Consequently, it will not be described here. For example, it is possible to find a description in the document "Voyager" of the firm ObjectSpace Inc., accessible at the Internet address http://www.objectspace.com.

According to the invention, the processing unit PM of the agent A is also responsible for configuring each repeater Fi which it generates so that it can transmit to at least one location server SL of the network, upon expiry of a selected duration, the location identifier of the next repeater F(i+1), stored in the memory M, in order that this server SL stores the same as correspondence of the primary identifier of the agent A.

The location server SL to this end comprises a memory Ml in which is stored a table of correspondence between at least the primary identifiers of agents A of the network and the location identifiers (or location references) which represent for example the last known addresses of the sites Hi where the agents A are lodged.

Thus, when a source S wishes to contact or locate an agent A with which it had established a communication when it was lodged on a site of the network, e.g. H2, it starts by trying to contact the site H2, which represents the last known address of the agent A, by addressing a message thereto. Then, if the agent A has moved, two situations must be envisaged according to which there is or is not a continuous chain of repeaters Fi connecting the repeater F2 of the site H2 to the site Hn (e.g. H4) where the agent A is lodged (or where it is on the point of being lodged).

In the first situation, the message coming from the source S arrives at the repeater F2 generated in the site H2 by the agent A when it has left the same. The repeater F2 then retrieves from its memory M the location identifier of the next site H3 in which the agent has generated the repeater F3, and transmits thereto the message received. The repeater F3 does the same. It retrieves from its memory M the location identifier of the next site H4 and transmits thereto the message received. The message can therefore be transmitted to the agent A, which may possibly respond thereto by contacting the source S direct, of which it knows the location identifier from the start. However, it is preferable when a message reaches the agent A by means of the chain of repeaters, that the processing unit PM of the agent A starts by transmitting to the source S the location identifier of the site Fi where it is lodged.

In the second situation, the message coming from the source S reaches the repeater F2 generated in the site H2 by the agent A when he has left it. For example, as is shown in FIG. 1, the chain of repeaters Fi is interrupted between the sites H2 and H3. Since the repeater F2 cannot transmit the message from the source S to the next repeater H3, it addresses to the source S a message notifying the same of this impossibility (arrow FL1). In FIG. 1, the arrows in a solid line represent the knowledge of a location identifier, whereas the dotted arrows represent a communication.

The source S then establishes a communication with the location server SL (arrow FL2) in order to determine therefrom the last known location identifier of the agent A. In the example shown in FIG. 1, the location identifier which is stored in the memory Ml of the server SL, as correspondence of the primary identifier of the agent A, is that of the site H3 (and therefore of the repeater F3). The server SL then communicates to the source S the location identifier of the site H3. Then, the source establishes a communication with the site H3 (arrow FL3) in order to transmit thereto the message intended for the agent A. Upon receiving the message, the repeater F3 retrieves from its memory M the location identifier of the next site H4 (where the agent A is lodged in this case) and transmits thereto the message received (arrow FL4). The message can therefore be transmitted to the agent A, which may then possibly respond thereto by contacting the source S direct, of which he knows the location identifier from the start (arrow FL5). It is preferable, however, when a message comes to the agent via at least one repeater Fi that the processing unit PM of the agent A starts by transmitting to the source S the location identifier of the site Fi where it is lodged and its primary identifier.

FIG. 2 illustrates a modification of the situation shown in FIG. 1. Here, the chain of repeaters Fi is also interrupted between the sites H2 and H3, but the location identifier which is stored in the memory Ml of the server SL, as correspondence of the primary identifier of the agent A, is that of the site H4. Since the repeater F2 cannot transmit the message from the source S to the next repeater H3, it addresses to the source S a message notifying him of this impossibility (arrow FL1).

The source S therefore establishes a communication with the location server SL (arrow FL2) in order to determine therefrom the last known location identifier of the agent A. The server SL therefore communicates to the source S the location identifier of the site H4. Then, the source establishes a communication with the site H4 (arrow FL3) and therefore with the agent A in order to transmit the message to him, to which he may possibly respond.

By virtue of the invention, by using both a location server SL and repeaters Fi, the location of an agent is therefore considerably facilitated. However, in order to prevent the repeaters Fi from unnecessarily taking up the resources of the network in order to maintain their links, the invention proposes, as hinted above, a mechanism for ceasing activity.

More particularly, each repeater Fi generated by an agent A has as a supplement to the memory M, in which is stored the location identifier of the next site H(i+1), a timer CTF, which is activated at the moment when it is generated in the site Hi, and a management unit MG.

The timer CTF is contrived to address a signal to the management unit MG when a selected duration has elapsed. This duration is for example of the order of a few milliseconds to a few seconds, according to the type of network and application. When the management unit MG receives this signal, it retrieves from the memory M the location identifier of the next site H(i+1) and transmits the same to the location server(s) SL of the network. Upon receiving this location identifier, the location server SL stores the same in its memory Ml as correspondence of the primary identifier of the agent concerned A. The location identifier received replaces in effect the old location identifier, previously stored. Then the management unit MG of the repeater Fi cancels incoming and outgoing connections which link it to the other repeaters (or sites) of its chain, which puts an end to the activities of the repeater Fi which are linked to this chain.

It is important to note that the repeater may remain active in one or more other chains if it belongs thereto.

If the repeater Fi of the site Hi does not belong to a single chain of repeaters, it may, once it has ceased its activities, be cancelled by what the person skilled in the art calls a "crumb-collector". In the opposite case, it cannot be cancelled by the crumb-collector until it has ceased all its activities.

In order to prevent a location identifier corresponding to a site H(i+n) being replaced by a location identifier corresponding to a site Hi placed upstream in its chain, which may happen when the agent moves (or migrates) very rapidly and has already caused to arrive at the location server SL, as will be seen below, the location identifier of the site H(i+n) where it is lodged (or where it has recently lodged ), the agent A attributes to each repeater Fi, at the moment when it is generated, a position identifier representing its position in the chain of repeaters. The function of the repeater Fi is therefore slightly modified compared to that described above. This function is shown in the form of an algorithm in FIG. 3.

When the agent decides to migrate from a site, e.g. H2, to another site, e.g. H3, in a stage 10 its processing unit PM generates the repeater F2 by configuring the same, on the one hand with a timer CTF set at a selected duration, and on the other hand with a memory M containing the location identifier of the site H3 (and obviously the location identifier of the location server(s) SL and the primary identifier of the agent A) as well as its position identifier. The timer CTF is activated at the moment when the repeater Fi is generated.

Then, in a stage 20, the timer CTF checks regularly if its current time value is higher than the selected duration. If this is not so, the timer CTF carries on with its counting and checking. On the other hand, if the current time value becomes equal to the selected duration, the timer CTF addresses a signal to the management unit MG.

In a stage 30, the management unit MG retrieves from the memory M the location identifier of the next site H(i+1), the location identifier of the location server SL, the primary identifier of the agent A and the position identifier of the site Hi, and transmits these to the location server SL of the network.

Then, in a stage 40, the management unit MG checks whether the repeater Fi belongs to another active chain. If so (stage 50), it only cancels the incoming and outgoing connections which link it to the other repeaters (or sites) of the chain which it wants to leave, thus allowing the repeater Fi to carry out its activities with the other chains to which it belongs. If not (stage 60), the management unit MG cancels the incoming and outgoing connections which link it to the other repeaters (or sites) of its chain, which puts an end to the activities of the repeater Fi, which can then be cancelled by the crumb-collector.

In this modification, the memory Ml of the location server SL also stores a position identifier as correspondence of the primary identifier and the location identifier. Consequently, when the location server SL receives the different location and position identifiers from a repeater Fi, it can immediately present the position identifier received to the position identifier stored in its memory Ml as correspondence of the primary identifier concerned.

If the position identifier received corresponds to a position value which is lower than that which corresponds to the position identifier stored, then the memory Ml is not updated. In the opposite case, the server SL updates its memory Ml by replacing the old position identifier and location identifier by those received.

In order to facilitate further the location of an agent A, the invention proposes an optional supplementary mechanism, described below with reference to FIG. 4.

This is in fact a mechanism for updating the location server SL by the agent A.

In order to implement this mechanism, each agent A is equipped with at least one first migration counter CM1, whose current value indicates the number of migrations carried out by the agent A since its last initialisation.

The processing unit PM is furthermore contrived to increment by one unit of value the first migration counter CM1 each time the processing unit generates a new repeater Fi in a site Hi, then to compare this new value to a selected threshold, and if this exceeds the threshold, to address to the location server SL the location identifier of the site in which its agent is implanted (obviously accompanied by its primary identifier) in order that it stores this as correspondence of its primary identifier. The processing unit PM can then initialise the first counter CM1 in order that a new count can be started at the next migration.

The agent A may also comprise a timer CTA for counting the time which it spends on one site Hi. In this case, the processing unit PM is contrived to monitor the current value of the timer CTA so that each time this value is equal to a selected duration, it addresses to the location server SL the location identifier of the site in which it is implanted (obviously accompanied by the primary identifier of the agent A) in order that it stores the same as correspondence of its primary identifier. The processing unit PM can then initialise the timer CTA so that a new count starts.

Preferably, the processing unit PM is contrived so as to trigger counting of the timer CTA, obviously after initialising the same, having carried out the comparison of the value of the primary migration counter CM1 to the selected threshold, and more particularly, each time that the result of the comparison indicates that the value of the first migration counter CM1 is lower than the selected threshold.

However, obviously operation in parallel (or decorrelated operation) of the update of the location server SL is conceivable, via the comparison relating to the number of migrations and via the comparison relating to the time spent on a site Hi.

Also, preferably, the processing unit PM is contrived so as to initialise the first migration counter CM1 after each transmission to the location server SL of the location identifier of its agent A, consequent upon a comparison relating to the time spent on the side Hi.

Furthermore, the processing unit PM can be contrived to stop counting of the timer CTA when its agent A migrates to another site H(i+1).

Finally, the agent A may also comprise a second migration counter CM2, whose value defines a position identifier representing its position within the chain of repeaters Fi. The processing unit PM is therefore responsible for incrementing by one unit the value of the second migration counter CM2 each time its agent A migrates.

Furthermore, in this case the processing unit PM transmits the location and position identifiers to the location server SL when the value of the first migration counter CM1 is higher than the selected threshold. In this way, the location server can carry out its comparison of position and decide on updating its memory Ml when the position received is higher than that stored.

The value which the second migration counter CM2 has at the moment when an agent A is preparing to leave a site Hi advantageously acts as a position identifier to the repeater Fi generated.

An example of a full function algorithm of the agent A is shown in FIG. 4.

When an agent A is preparing to migrate from a site, e.g. H3, to another site, e.g. H4, its processing unit PM generates a repeater F3 in a stage 100.

Once the repeater F3 is generated, the agent A migrates to the site H4 (stage 110). Once it has arrived at this site H4, the processing unit PM increments the first CM1 and second CM2 migration counters of its agent A (stage 120). Then, in a stage 130, the processing unit PM compares the current value of the first migration counter CM1 to a selected threshold.

If the value is higher than the threshold, then in a stage 140, the processing unit PM triggers the updating procedure of the server by transmitting thereto the location identifier of the site H4, its own primary identifier and its position identifier (which is given by the value of its second migration counter CM2), then it initialises the first migration counter CM1.

On the other hand, if the value is lower than or equal to the threshold, then in a stage 150, the management unit PM activates its timer CTA in order that this starts its timing. Then, in a stage 160, the management unit PM regularly compares the value of its timer CTA to a selected duration. If this value becomes equal to the selected duration, the management unit PM activates its timer CTA and moves on to the stage 140 of updating the location server SL and of initialising the first migration counter CM1. On the other hand, if the value is lower than the selected duration, the processing means PM checks if the agent A is in the process of migration. If not, the processing means PM returns to the comparison stage 160. On the other hand, if this is the case, the processing unit PM interrupts the counting of the timer CTA (stage 180).

The processing unit PM, the migration counters CM1 and CM2 and the timer CTA of the agent A can take the form of electronic circuits, software (or IT) units, or a combination of software units and electronic circuits. Furthermore, the repeaters Fi preferably take the form of software (or IT) units.

The invention is not restricted to the embodiments of the communicating mobile object and method of location described above purely by way of example, but embraces all the modifications which can be conceived by the person skilled in the art within the scope of the claims below.

Thus, in the above, communications networks are described which only comprise a single location server. However, in certain conditions, it may be advantageous to have plural such servers.

Furthermore, in the above, situations are described in which the source was a fixed communication object. However, the invention also applies to situations in which the source and agent are both communicating mobile objects. In this case, the source has an arrangement substantially identical to that of the agent.

Moreover, in the above, an application is described in which the agents were mobile telephones. However, the invention is not limited to this application. It relates in fact, in particular, to computing agents in infrastructures known as "Global Computing" or of the "Grid" type, computing agents dedicated to the interrogation of distributed databases, users within WiFi networks, and users in GSM/GPRS or UMTS networks.

The invention claimed is:

1. Method of locating communicating mobile objects in a communications network, in which, in the case of a communication being established between first (S) and second (A) communicating objects, the second of which (A) at least is mobile, in sites (Hi) through which the second object (A) is passing, repeaters (Fi) are generated communicating from one to the next within a chain which they form together, so as to relay to the second object (A) each message coming from the first object (S), characterised in that it further comprises:
   storing in each repeater (Fi) an identifier representing the location of the next repeater (F(i+1)) or site (H(i+1)) within the chain,
   allocating a timer (CTF) to each repeater (Fi) at the moment when this is generated, so that upon expiry of a selected duration, it addresses to at least one location server (SL) of the network the said location identifier of the next repeater (F(i+1)) or site (H(i+1)) in order that this is stored in the server (SL) as correspondence of a primary identifier of the second object (A).

2. Method according to claim 1, characterised in that a first migration counter (CM1) is allocated to the second object (A), then the value of the primary counter (CM1) is incremented by one unit upon the creation of each new repeater (Fi) in a site (Hi), and the value is compared to a selected threshold so that if this value exceeds the threshold, the second object (A) addresses to the server (SF) its own location identifier in order that this is stored as correspondence of its primary identifier, the first counter (CM1) being then reinitialised.

3. Method according to claim 1, characterised in that a timer (CTA) is allocated to the second object (A) so that upon expiry of a selected duration, this addresses to the server (SL) its own location identifier in order that this is stored in the server as correspondence of its primary identifier, the timer (CTA) being then initialised so that a new count starts.

4. Method according to claim 2, characterised in that the counting of the timer (CTA) is triggered after the timer has been initialised, when the result of the comparison indicates that the value of the first counter (CM1) is lower than the threshold.

5. Method according to claim 2, characterised in that the first counter (CM1) is initialised after each transmission to the server (SL) of the location identifier of the second object (A), consequent upon a comparison relating to the time spent on a site (Hi).

6. Method according to claim 3, characterised in that the counting of the timer (CTA) of the second object (A) is stopped when it migrates from one site (Hi) to another (H(i+1)).

7. Method according to claim 1, characterised in that after addressing its locating identifier the repeater (Fi) ceases its relay activity.

8. Method according to claim 7, characterised in that once the repeater (Fi) has ceased its relay activity and if it does not belong to another chain, it is cancelled.

9. Method according to claim 1, characterised in that each repeater (Fi) is allocated a position identifier representing its position within the chain, and in that upon expiry of the selected duration the repeater (Fi) addresses to the server (SL) the location identifier of the next repeater (F(i+1)) and its own position identifier so that these are stored in the server (SL) as correspondence of the primary identifier of the second object (A).

10. Method according to claim 9, characterised in that the position identifier of the transmitting repeater (Fi) and the location identifier of the next repeater (F(i+1)) or site (H(i+1)) are stored in the server (SL), as correspondence of the identifier of the second object (A), when the position identifier has a value higher than that stored.

11. Method according to claim 2, characterised in that there is allocated to the second object (A) a second migration counter (CM2) whose value is incremented by one unit upon each migration and defines a position identifier representing its position within the chain, and in that if the selected threshold is exceeded by the first migration counter (CM1), the second object (A) addresses to the server (SL) its own location identifier and the position identifier representing the value of its second migration counter (CM2) so that these are stored in the server (SL) as correspondence of the primary identifier of the second object (A).

12. Method according to claim 11, characterised in that the position identifier of the second object (A) and its location identifier are stored in the server (SL), as correspondence of the primary identifier of the second object (A), when the position identifier has a value higher than that stored.

13. Method according to claim 9, characterised in that the position identifier of a repeater (Fi) of a site (Hi) is representative of the value of the second migration counter (CM2) of the second object (A) at the moment when this leaves the site (Hi).

14. Communicating mobile object (A) for a communications network, comprising processing means (PM) capable, if a communication is set up with another communication object (S) of the said network, of generating in sites (Hi) through which it passes, repeaters (Fi) communicating from one to the next within a chain which they form together so as to relay each message coming from the other object (S) to their mobile object (A), characterised in that the processing means (PM) are contrived to allocate to each repeater (Fi), at the moment when this is generated, a timer (CTF) and to configure the repeater (Fi) so that, on the one hand, it can store an identifier representing the location of the next repeater (F(i+1)) or site (H(i+1)) within the chain, and on the other hand, so that it transmits to at least one location server (SL) of the network, upon expiry of a selected duration, the location identifier of the next repeater (F(i+1)) or site (H(i+1)) within the chain, in order that it stores these as correspondence of a primary identifier of the mobile object (A).

15. Mobile object according to claim 14, characterised in that it comprises a first migration counter (CM 1), and in that the processing means (PM) are contrived, each time they generate a new repeater (Fi) in a site (Hi), to increment by one unit the value of the first counter (CM1), then to compare the value to a selected threshold, then, if the threshold is exceeded, to address to the server (SL) the location identifier of their mobile object (A) in order that it stores these as correspondence of its primary identifier, and to initialise the first counter (CM1).

16. Mobile object according to claim 14, characterised in that it comprises a timer (CTA), and in that the processing means (PM) are contrived, upon expiry of a selected duration, to address to the server (SL) the location identifier of their mobile object (A) in order that it stores the same as correspondence of its primary identifier, then to initialise the timer (CTA) so that a new count starts.

17. Mobile object according to claim 15, characterised in that the processing means (PM) are contrived to trigger the counting of the timer (CTA) after initialising the same, each time the result of the comparison indicates that the value of the first migration counter (CM1) is lower than the threshold.

18. Mobile object according to claim 15, characterised in that the processing means (PM) are contrived to initialise the first migration counter (CM1) after each transmission to the server (SL) of the location identifier of their mobile object (A) consequent upon a comparison relating to the time spent on a site (Hi).

19. Mobile object according to claim 16, characterised in that the processing means (PM) arc contrived to stop counting of the timer (CTA) when their mobile object (A) migrates from one site (Hi) to another (H(i+1)).

20. Mobile object according to claim 14, characterised in that the processing means (PM) are contrived to configure each repeater (Fi), at the moment when it is generated, so that it ceases its activity after addressing to the server (SL) its location identifier.

21. Mobile object according to claim 14, characterised in that the processing means (PM) arc contrived to allocate to each repeater (Fi), at the moment when it is generated, a position identifier representing its position within the chain, so that upon expiry of the selected duration, the repeater (Fi) addresses to the server (SL) the location identifier of the next repeater (F(i+1)) or site (H(i+1)) and its own position identifier in order that these are stored in the server (SL) as correspondence of the primary identifier of the mobile object (A).

22. Mobile object according to claim 15, characterised in that it comprises a second migration counter (CM2) whose value defines a position identifier representing the position of the mobile object (A) within the chain, and in that the processing means (PM) are contrived to increment by one unit the value of the second migration counter (CM2) upon each migration of the mobile object (A) and to transmit to the server (SL), if the selected threshold is exceeded by the first migration counter (CM1), the location and position identifiers of their mobile object (A) so that it stores these as correspondence of the primary identifier of the mobile object (A).

23. Mobile object according to claim 21, characterised in that the processing means (PM) are contrived to communicate to the repeater (Fi) of the site (Hi) the value of the second migration counter (CM2) when their mobile object (A) leaves a site (Hi), in order that this value forms the position identifier of the repeater (Fi).

24. Mobile object according to claim 14, characterised in that it forms a selected mobile terminal in a group comprising at least mobile telephones, portable computers, electronic personal organisers and logical computing units which can move from one site to another.

* * * * *